United States Patent [19]

Fukuzawa et al.

[11] Patent Number: 4,530,424
[45] Date of Patent: Jul. 23, 1985

[54] AUTOMATIC BRAKING-GAP ADJUSTER SYSTEM FOR HYDRAULIC BRAKE

[75] Inventors: Genichiro Fukuzawa; Isao Idesawa, both of Nagano, Japan

[73] Assignee: Nisshin Kogyo Kabushiki Kaisha, Japan

[21] Appl. No.: 517,203

[22] Filed: Jul. 25, 1983

[30] Foreign Application Priority Data

Sep. 30, 1982 [JP] Japan .............................. 57-148121[U]
Sep. 30, 1982 [JP] Japan .............................. 57-148122[U]

[51] Int. Cl.³ .............................................. F16D 65/56
[52] U.S. Cl. ........................ 188/196 D; 188/79.5 GE
[58] Field of Search ........ 188/196 D, 196 BA, 196 R, 188/79.5 GE, 79.5 R, 71.9

[56] References Cited

U.S. PATENT DOCUMENTS 3,026,976  3/1962  Kell ................ 188/79.5 GE X
3,783,981  1/1974  Burgdorf .................... 188/196 D X
3,811,538  5/1974  Farr ...................... 188/79.5 GE
4,056,173  11/1977  Farr ...................... 188/71.9

Primary Examiner—Bruce H. Stoner, Jr.
Assistant Examiner—Michael P. Gilday
Attorney, Agent, or Firm—Cantor and Lessler

[57] ABSTRACT

An automatic braking-gap adjuster system for hydraulic brakes having an adjusting nut and bolt combination wherein the nut engages threadedly the bolt, the combination being disposed in the hydraulic chamber defined by a piston slidably inserted through an associated cylinder and a portion of the cylinder facing the piston, and the adjusting bolt abutting at its clutch section against a clutch face of the portion of the cylinder. A spring retainer having its legs fixed to the piston so as to be engageable with the adjusting nut such that the nut is restrained from turning, and a spring arranged in a contracted state between a spring seat of the spring retainer and the adjusting nut for biasing the adjusting nut toward the piston are provided. The spring retainer is mounted in place by inserting its legs through notches formed in the adjusting nut and holding them in openings formed in the piston. Alternatively, the spring retainer is mounted in place by holding its legs in openings formed in a collar adapted to define a cup chamber of the piston, the opening being in communication with the hydraulic chamber. Thus, it is unnecessary to provide any separate holder on the piston, which would otherwise render the production of hydraulic brakes more difficult. The adjusting nut is engaged with the end of the spring serving to bias the adjusting nut toward the piston, whereby it is kept from turning.

1 Claim, 4 Drawing Figures

AUTOMATIC BRAKING-GAP ADJUSTER SYSTEM FOR HYDRAULIC BRAKE

BACKGROUND OF THE INVENTION

With hydraulic brakes such as drum brakes or disc brakes for vehicles, the braking-gap should always be kept constant by moving the piston toward the brake linings by means of a braking-gap adjuster device, said piston serving to push the brake linings, since, due to wear caused by braking, there is an increase in the braking gap between the linings (frictional pads) and a brake drum (a brake disc).

To this end, the piston is slidably inserted through an associated cylinder to define a hydraulic chamber between the piston and a portion of the cylinder facing it. Between the piston and that portion of the cylinder, there is arranged a nut and bolt adjuster combination wherein the nut threadedly engages the bolt. The adjusting bolt abuts at its clutch section against the clutch face of the facing portion, while the adjusting nut abuts against the piston through a spring. When the braking-gap exceeds a predetermined value, the adjusting bolt is threadedly moved to advance the piston, whereby the braking-gap is kept constant.

In accordance with this automatic braking-gap adjuster arrangement, however, it is required to engage the adjusting nut with the piston under a given load to assure that the adjusting nut is kept from turning. This leads to a increase in the number of parts with the resulting rise in cost. In addition, this arrangement is troublesome to assemble.

SUMMARY OF THE INVENTION

The automatic braking-gap adjuster system for hydraulic brakes according to the present invention comprises:

an adjusting nut and bolt combination wherein the nut threadedly engages the bolt, said combination being disposed in a hydraulic chamber defined by a piston slidably inserted through an associated cylinder and a portion of the cylinder facing the piston, and said adjusting bolt abutting at its clutch section against a clutch face of said portion of the cylinder;

a spring retainer having its legs fixed to said piston so as to be engageable with said adjusting nut such that said nut is restrained from turning; and a spring arranged in a contracted state between a spring seat of said spring retainer and said adjusting nut for biasing said adjusting nut toward said piston.

Thus, a main object of the present invention is to provide a novel automatic braking-gap adjuster system to be built in a brake cylinder for a vehicle, which serves to keep an adjusting nut from turning by mounting a spring retainer to a piston, assures extension of an adjusting bolt, and is easier to assemble.

BRIEF DESCRIPTION OF THE DRAWINGS

By way of example, specific embodiments of the present invention will now be described with reference to the accompanying drawings, in which.

DETAILED DESCRIPTION OF SPECIFIC EMBODIMENTS

The present invention will now be explained in detail with respect to one embodiment which refers to a drum brake of the two cylinder type.

Figure 1:
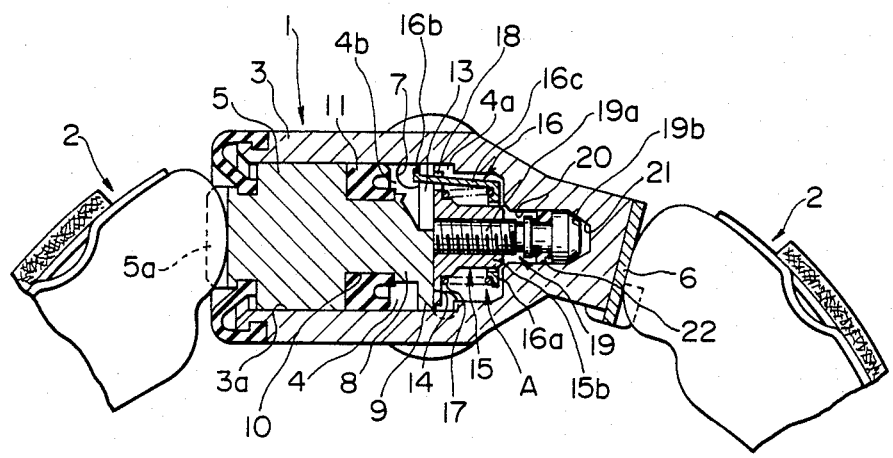
FIG. 1 is a sectioned front view of part of one embodiment wherein the present invention is applied to a drum brake for vehicles.

Referring to the drawings, on the inner side of a back plate (not shown) fixed to a vehicle body there are a pair of wheel cylinders 1 (the lower one being omitted from FIG. 1) and a pair of brake shoes 2 and 2, which are disposed symmetrically around the center of the back plate.

The wheel cylinder 1 comprises a cylinder body 3 having a cylinder bore 3a being open at one end, and a single piston 5 which fits slidably into the bore 3a to define a hydraulic chamber 4, said cylinder body 3 being fixed to the back plate. The cylinder body 3 is provided at its outer end with a retainer 6, while the piston 5 is formed at its outer end with an engaging groove 5a, which engage the associated ends of the brakes shoes 2 and 2. Engagement of the retainer 6 and the groove 5a with the brake shoes 2 and 2 then prevents relative rotation of the cylinder body 3 and the piston 5.

The wheel cylinder 1 is provided in its hydraulic chamber 4a with a port 7 for the introduction of a hydraulic pressure output from a brake master cylinder (not illustrated).

An automatic braking-gap adjuster system generally shown at A is accommodated within the hydraulic chamber 4 of the wheel cylinder 1, and will now be described in detail below.

Figure 2:
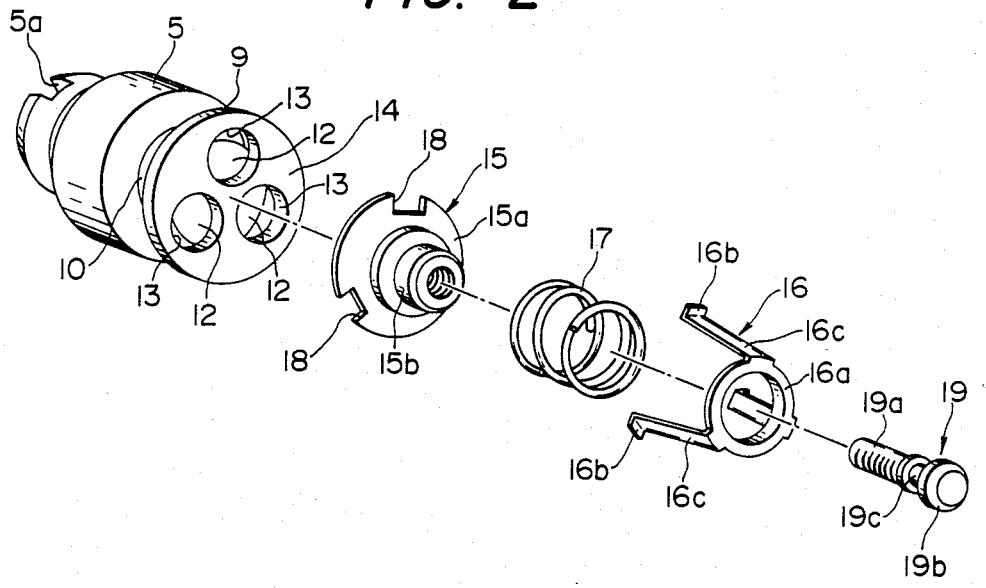
FIG. 2 is an exploded perspective view of various members forming the automatic braking-gap adjuster system according to the present invention.

The piston 5 has a reduced diameter portion 8 which is provided at its free end with a collar 9 and formed therein with a cup groove 10, into which a piston cup 11 is fitted, as shown in FIG. 2. The piston 5 is also provided therein with three round openings 12 by boring, and the collar 9 is formed therein with three communicating openings 13 in the crescent form, correspondingly.

Hence, the hydraulic chamber 4a communicates with a cup chamber 4b. With this arrangement, it is easy to remove an amount of air from the adjuster system A disposed within the cup chamber 4b and hydraulic chamber 4a of the piston 5, since the said port 7 is located within the cup chamber 4b, and communicates therewith through the said openings 13.

The collar 9 is formed at its end face 14 with an adjusting nut 15 with its collar 15a being movable away therefrom. The adjusting nut 15 is fixedly held with respect to the collar 9 of the piston 5 by a spring 17 in cooperation with an associated spring retainer 16. The adjusting nut 15 is notched at 18 in its collar 15a so as to be able to be in operative association with the said communicating openings 13 formed in the collar 9 of the piston 5. The spring retainer 16 then comprises a spring seat 16a and three legs 16c bent-outwardly at 16b at their free ends.

Reference is made to the assembling of piston 5, adjusting nut 15, spring retainer 16 and spring 17.

The adjusting nut 15 is first caused to abut at its collar 15a against the end face 14 of the collar 9 of the piston 5 with notches 18 being in alignment with the communicating openings 13. The spring 17 is interposed between the adjusting nut 15 and the spring retainer 16, and the legs 16c of the retainer 16 are fitted into the notches 18 in the adjusting nut 15. The bent pieces 16b are then held in place within the communicating openings 13 in the collar 9. Finally, the spring 17 is located in a contracted state between the collar 15a of the adjusting nut 15 and the spring seat 16a of the retainer 16.

The thus assembled adjusting nut 15 is movable away from the end face 14 of the collar 9 against the action of the spring 17, but is allowed to abut fixedly against that end face, since it receives in its notches the legs 16c of the spring retainer 16.

The adjusting nut 15 threadedly receives through its shank 15b an externally threaded shank 19a of an adjusting bolt 19. However, between the adjusting nut 15 and the adjusting bolt 19 there is allowed for an axial back-lash which corresponds to a suitable braking-gap, viz., a suitable spacing between the brake shoe 2 or 2 and a brake drum (not shown).

The adjusting bolt 19 is provided at its head with a clutch section 19b, which is adapted to be rotatably inserted into a reduced diameter cylinder portion 20 formed on the inner end wall of the cylinder body 3, and a conical clutch face 21 formed on the innermost wall of that reduced diameter portion. The adjusting bolt 19 then receives in its groove 19c a sealing member 22 to prevent the hydraulic pressure in the chamber 4 from acting upon the clutch face 21.

The foregoing embodiment operates as follows. Where the brakes are off, a return spring force acts upon the piston 5 through the brake shoe 2 to retract the piston 5, and is transmitted between the clutch section 19b and the clutch surface 21 via the adjusting nut 15 and bolt 19 to generate a clutch torque. In this state, a rotational torque acts upon the adjusting bolt 19 since the adjusting nut 15 engages threadedly the adjusting bolt 19. However, since the clutch torque is set at a value larger the rotational torque, the adjusting bolt 19 does not rotate, and the piston 5 remains unchanged.

To put the brakes on, a pressurized liquid is admitted from the port 7 into the hydraulic chamber 4a via the cup chamber 4b by actuating the master cylinder, upon which the piston 5 advances axially to move the brake shoes 2 into engagement with the inner face of the brake drum rotating in unison with the wheels.

Where the abrasion of the brake linings does not reach a given value or just after the adjustment of the braking-gap, as the piston 5 advances, the adjusting nut 15 moves while taking abutment onto the collar 9 through the spring retainer 17 under the action of the spring 17. Since the amount of movement of the adjusting nut 15 is limited to the back-lash, the adjusting bolt 19 does not give rise to any torque. With the brakes off, the piston 5 returns to its original position together with the adjusting nut 15.

In a normal braking state, the hydraulic pressure of the chamber 4 is relatively low so that a relatively small frictional bonding force acts upon the clutch section 19b of the adjusting bolt 19 and the clutch face 21 of the reduced diameter cylinder portion 20. Accordingly, the adjusting nut 15 moves together with the piston 5 while taking abutment onto the end face 14 of the collar 9 through the spring retainer 16 under the action of the spring 17, if the piston 5 moves further outwardly with the progress of abrasion of the brake linings applied over the brake shoes 2 and 2.

The amount of movement of the adjusting nut 15 is then the sum of the back-lash and the abrasion of the brake linings, and exceeds the back-lash. For this reason, the adjusting bolt 19 moves in unison with the adjusting nut 15, so that the clutch section 19b of the adjusting bolt 19 disengages the clutch face 21 of the reduced diameter cylinder portion 20. The adjusting nut 15 is then urged against the end face 14 of the collar 9 under the action of the spring 17, and kept from turning by the legs 16c of the spring retainer 16. As a consequence, a torque is generated from the threaded engagement of the adjusting nut 15 with the adjusting bolt 19, whereby the adjusting bolt 19 turns with respect to the adjusting nut 15 and moves toward and into re-engagement with the clutch face 21. In this way, automatic compensation for the abrasion of the brake linings is effected. If the pressure within the hydraulic chamber 4a is reduced to put the brakes off, the brake shoe 2 or 2 receives the return force of the return spring and contracts. The return force then acts upon the piston 5, the adjusting nut 15 and the clutch section 19b of the adjusting bolt 19 and gives rise to a thrust pointing to the clutch face 21, so that the clutch section 19b engages frictionally the clutch face 21, thereby keeping the adjusting bolt 19 from turning. Consequently, the piston 5 and the adjusting nut 15 move backward only by a stroke corresponding to the back-lash allowed for between the adjusting nut 15 and the adjusting bolt 19, with the result that between the brake lining of each brake shoe and the inner face of the brake drum, a braking-gap is defined corresponding to the said back-lash.

Where intensive braking takes place, the automatic adjustment as mentioned above is effected by the time the hydraulic pressure within the chamber 4a rises to a predetermined value at which parts such as the brake drum or the brake shoes deform elstically. If that pressure exceeds the predetermined value, the adjusting bolt 19 is kept from turning, since the aforesaid thrust increases in response to an increase in the hydraulic pressure, and keeps the clutch section 19b in frictional engagement with the clutch face 21. This causes that the adjusting nut 15 is restrained from turning by the legs 16c of the spring retainer 16, and fastened onto the adjusting bolt 19. When the piston 5 moves further outward as a result of the elastic deformation of the parts such as the brake drum, the spring 17 deflects, the adjusting nut 15 remains unchanged together with the adjusting bolt 19, and the end face 14 of the piston 5 disengages the adjusting nut 15. In this way, the aforesaid automatic adjustment is discontinued.

As mentioned above, the adjusting nut forming part of the automatic braking-gap adjuster system housed in the hydraulic chamber of the wheel cylinder is fixedly provided to the piston through the spring retainer for holding the spring adapted to be always in engagement with the piston. Thus, the adjusting bolt can appropriately be extended threadedly in response to the abrasion loss of brake linings. When further intensive braking takes place, the piston moves away from the adjusting nut to prevent over-adjustment. In this case, the adjusting nut is smoothly and securely guided by the spring retainer. Since the adjusting nut is kept from turning by the spring retainer for holding the spring, it is unnecessary to provide the adjusting net etc. with any special means. This results in simplification of the structure of the adjusting nut and bolt combination with the resulting reduction in production costs, and attributes in improvements in work.

Figure 3:
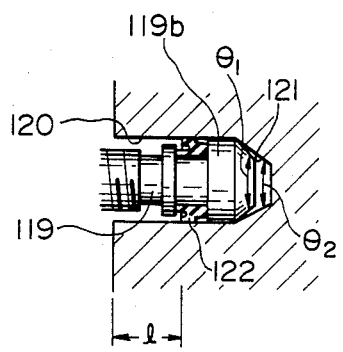
FIG. 3 is an enlarged sectional front view showing one specific embodiment of the clutch section.
Figure 4:
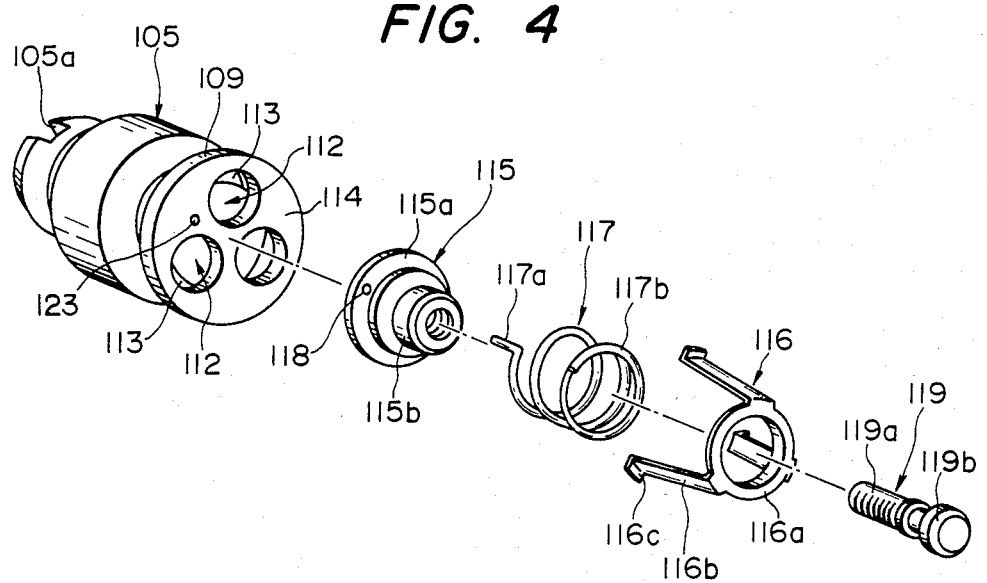
FIG. 4 is an exploded perspective view showing various members forming another embodiment of the automatic braking-gap adjuster system according to the present invention.

Another embodiment of the present invention will now be explained with reference to FIGS. 3 and 4.

An adjusting nut 115 is fixedly provided on a collar 109 of a piston 105 by a spring 117 held in place by a spring retainer 116. The spring 117 is in the form of a coil, and has its one end extension 117a inserted through a through-hole 118 formed in a collar 115a of the adjusting nut 115, and engaged within a hole 123 formed in the collar 109 of the piston 105. The spring 117 abuts at its other end against a spring seat 116a of the spring retainer 116 having its legs 116b retained at their bent pieces 116c in communicating openings 113.

The thus arranged spring 117 allows the adjusting nut 115 to be fixedly located on the collar 109 of the piston 105, and to be axially movable away from the end face 114 of the piston 105 against the action of the spring 117.

A clutch section 119b of the adjusting bolt 119 has a taper equal to or larger than a taper of the clutch face 121. Thus, the area (position) of contact of the clutch section 119b with the clutch face 121 can be maximized, resulting in an increase in clutch force and stabilization of clutch operation.

In addition, the distance 1 between the sealing member 122 of the adjusting bolt 119 and an open end of the reduced diameter cylinder portion 120 is equal to or larger than the piston stroke when the linings wear away completely. Accordingly, even when the adjusting bolt 119 excessively engages the relative nut 115 during inspection of the abrasion loss of linings, it is unlikely that the seal member 122 may disengage the open end, although the adjusting bolt 119 is pulled in the direction which the piston 105 advances, since the hydraulic pressure remains low in re-actuation. It is thus possible to prevent the working fluid from reaching the clutch face 121, which would otherwise have an adverse influence upon clutch operation.

Thus, according to this embodiment wherein the spring for holding the adjusting nut forming part of the automatic braking-gap adjuster system housed in the hydraulic chamber of the wheel cylinder is held in the openings formed in the collar adapted to define the cup chamber of the piston by means of the spring retainer, it is unnecessary to provide the piston etc. with any special means, thus resulting in simplification of the structure and substantial reductions in cost. The spring retainer is mounted in place by holding its legs in the openings with ease, accuracy and efficiency.

What is claimed is:

1. An automatic braking-gap adjuster system for hydraulic brakes of the type comprising a cylinder and a piston slidingly disposed therein to define a hydraulic chamber, said system comprising:
(A) said piston having a reduced diameter portion at one end thereof and a collar at the end of said reduced diameter portion, said collar having a plurality of communicating openings therein;
(B) an adjusting nut having a flat base portion with a plurality of peripheral notches thereon corresponding to said openings, and an internally threaded shank;
(C) an adjusting bolt threadedly engaging the nut, said adjusting bolt having a tapered head forming a clutch section;
(D) a spring retainer having a spring seat and a plurality of legs extending therefrom, said legs extending through said notches and fixed to said piston through said openings, whereby said adjusting nut is restrained from turning;
(E) a spring arranged in a contracted state between said spring seat and said adjusting nut for biasing said adjusting nut toward said piston; and
(F) said chamber having a reduced diameter portion terminating in a conical face at the end opposite said piston, said conical face serving as a clutch face against which said clutch section of said bolt bears.

* * * * *